United States Patent [19]

Black

[11] 4,398,560
[45] Aug. 16, 1983

[54] MULTIPLE SHUT-OFF VALVE

[76] Inventor: Kenneth C. Black, Site E, Rte. 2, Nanaimo, British Columbia, Canada, V9R 5K2

[21] Appl. No.: 252,910

[22] Filed: Apr. 10, 1981

[51] Int. Cl.³ ............................................. F16K 31/44
[52] U.S. Cl. ..................... 137/595; 137/597; 137/607; 137/614.19; 137/614.2; 74/532; 251/246; 251/297; 251/367
[58] Field of Search ...................... 137/595, 636, 636.2, 137/636.3, 614.19, 614.2, 597, 269, 607, 862, 881, 884; 251/113, 114, 116, 241, 246, 297, 231, 367, 290; 239/578, 583, 569; 74/532, 471 XY

[56] References Cited

U.S. PATENT DOCUMENTS

| 1,543,827 | 6/1925 | Doty | 251/241 |
|---|---|---|---|
| 1,674,121 | 6/1928 | Owens | 192/3 S |
| 1,731,020 | 10/1929 | Messer | 137/269 |
| 1,733,441 | 10/1929 | Barks | 137/614.19 |
| 1,851,263 | 3/1932 | Roach | 137/597 |
| 1,860,046 | 5/1932 | McCutcheon | 137/614.19 |
| 2,409,765 | 10/1946 | Kehle | 137/636 |
| 2,615,464 | 10/1952 | Hughey | 251/116 |
| 2,620,827 | 12/1952 | Jones | 251/116 |
| 2,645,241 | 7/1953 | Riede | 137/614.2 |
| 2,834,368 | 5/1958 | Gray | 251/367 |
| 3,107,694 | 10/1963 | Hastings et al. | 251/367 |
| 3,943,791 | 3/1976 | Casey | 137/636.2 |

FOREIGN PATENT DOCUMENTS

| 14966 | of 1903 | United Kingdom | 251/114 |
|---|---|---|---|
| 585842 | 2/1947 | United Kingdom | 251/116 |
| 715721 | 9/1954 | United Kingdom | 251/290 |

*Primary Examiner*—George L. Walton
*Attorney, Agent, or Firm*—Carver & Co.

[57] ABSTRACT

A valve apparatus for simultaneously shutting off or opening two gas supplies comprises two valve bodies for mounting a distance apart from each other. Each body has an internal conduit therethrough for the passage of gas. A lift valve within each conduit closes or opens the conduit with reciprocation of the valve. The lift valve has a valve stem engagable externally from each valve body. A pair of spaced-apart, parallel shafts are rotatably journalled at each end in apertures in the valve bodies and are axially slidable within the apertures, permitting the distance between the valve bodies to be varied. A first lever is connected to a first of the shafts and has a member connected thereto for engaging the valve stems, and a detent. A second lever is connected to a second of the shafts and has a notch for engaging the detent when the first lever is pivotted from a shut-off position to an open position where the member engages the valve stems to open the lift valves. The notch disengages from the detent when the second lever is pivotted so the first lever returns to the shut-off position, and the valves are closed.

11 Claims, 5 Drawing Figures

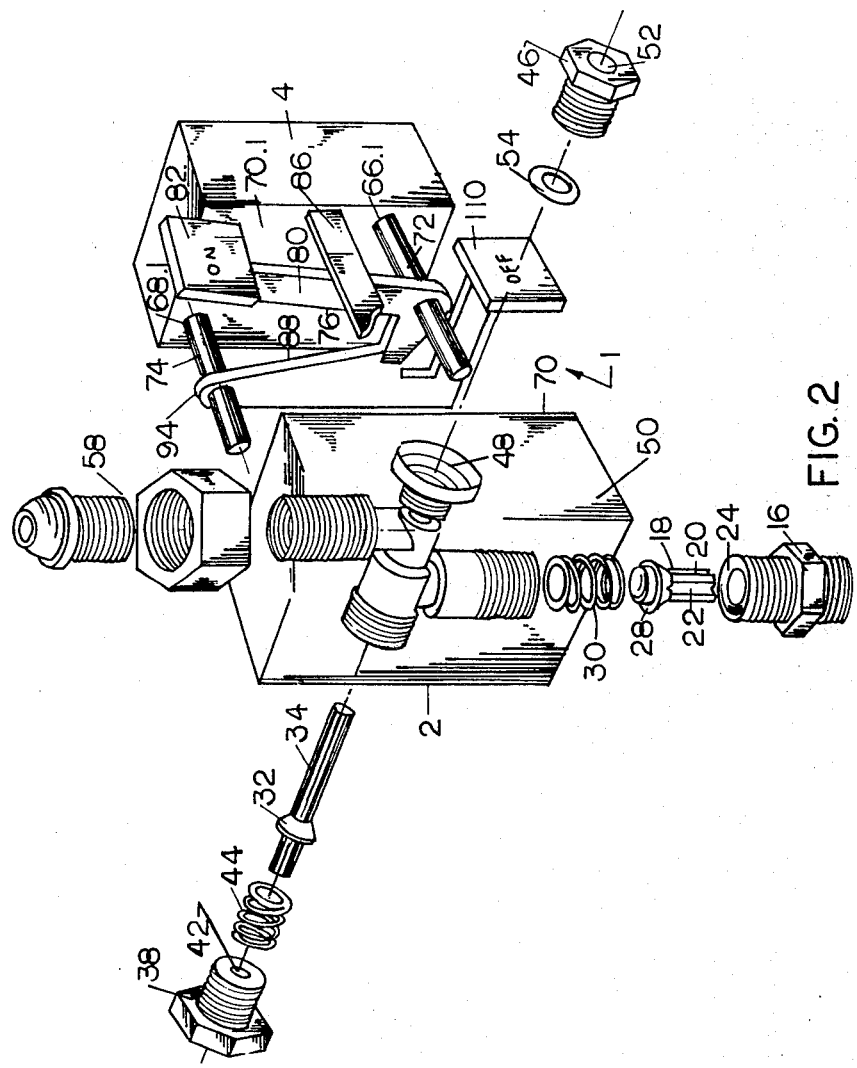
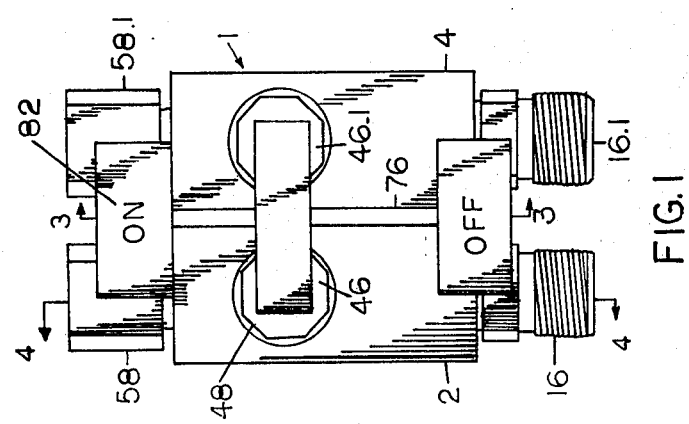
FIG. 2
FIG. 1

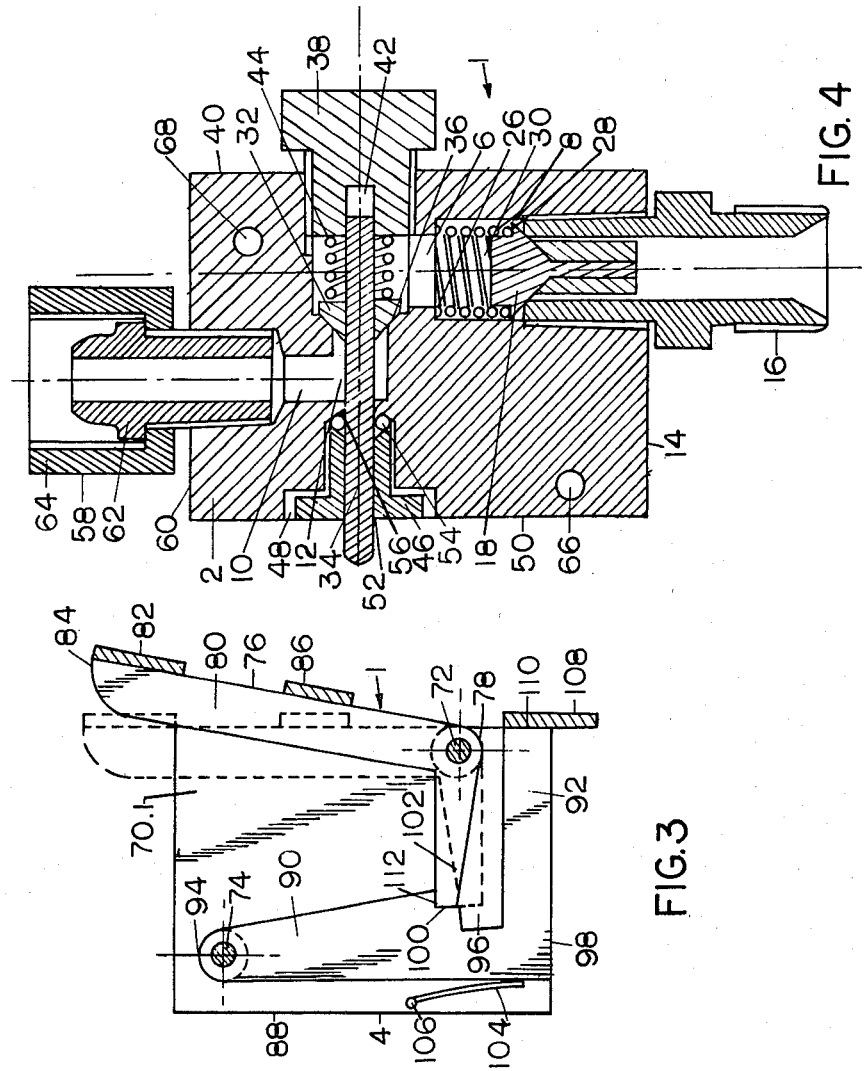

MULTIPLE SHUT-OFF VALVE

BACKGROUND OF THE INVENTION

A valve apparatus for simultaneously shutting off or opening two or more gas or fuel supplies.

Acetylene torches commonly operate on supplies of oxygen and acetylene or another combustible gas from two separate pressurized cylinders. Hoses connect the cylinders to the torch which usually has separate valves for regulating the flow of oxygen and acetylene. The proper mixture of oxygen and acetylene is set by adjusting these valves on the torch. However, when the operator wishes to extinguish the torch, it is necessary to close these valves to stop the flow of gases. The cylinders are provided with separate shut-off valves, but these are relatively inconvenient to use. Accordingly, each time the operator re-lights the torch, he must re-adjust the valves on the torch to obtain the correct mixture.

The normal procedure when starting to weld is to turn on the acetylene valve and then light the gas which produces a smoky yellow flame in the absence of sufficient oxygen. The operator then gradually opens the oxygen valve on the torch until he has the correct mixture of gases for the job he is doing. Both valves must be adjusted back and forth to get the exact flame required. Then, whenever the operator temporarily suspends welding to change his position or that of the work piece, he must either lay the burning torch down, or hold it with one hand while he adjusts the work piece with the other, or turn off both valves and lose the correct gas mix adjustment.

Accordingly, it is desirable to provide a convenient means for temporarily shutting off the flow of gases while maintaining the mixture adjustments on the torch valves. Preferably, this means should be connectable to conventional torches. The improvement could then be utilized with the many torches in use.

One solution to this problem would be to provide a shut-off valve for mounting on the torch which would simultaneously shut-off or open the oxygen and acetylene supplies. However, such a valve should be capable of instantly opening or closing with the greatest ease of convenience to the operator. This is necessary if the device is to gain widespread acceptance in view of the many times during a working day that the operator would utilize it. Additionally, the spacing between adjacent gas fittings on torches sometimes varies and the device should be capable of accommodating such variable spacing.

U.S. Pat. No. 1,851,263 to Roach is an earlier patent showing an acetylene torch with two valves activated by a single lever acting against two coil springs via valve stems. The trigger, however, controls an auxiliary burner.

U.S. Pat. No. 2,095,751 to Kirk discloses a welding torch having a lever which causes a bar to act against two similar valve stems and two coil springs.

U.S. Pat. No. 2,054,346 to Van Sittert discloses a multi-way valve which uses valve stems with enlarged heads compressed by springs.

U.S. Pat. No. 1,172,903 to Plumley discloses a cutting torch having a number of different inlet and outlet valves.

U.S. Pat. No. 3,080,570 to Weddendorf shows two fluids entering through two separate valves actuated by a single lever to form a mixture of fluids.

U.S. Pat. No. 1,223,762 to Bugatti discloses two spring biased valves actuated by a common lever compressing the springs by applying pressure to their valve stems.

In summary, while these earlier patents do show the general concept of a common lever used to depress valve stems against spring pressure to permit a flow of gases, they do not show a valve apparatus for simultaneously shutting off or opening two gas supplies which is adapted for use with existing acetylene torches, which can be mounted on the fittings of torches where the spacing between the torch fittings is variable, and which is sufficiently convenient in use to gain widespread approval by welders.

SUMMARY OF THE INVENTION

According to the invention, a valve apparatus for simultaneously shutting off or opening two gas supplies comprises two valve bodies for mounting a distance apart from each other. Each said valve body has an internal conduit therethrough for the passage of gas. A lift valve within each conduit closes or opens the conduit with reciprocation of the valve. Each lift valve has a valve stem engagable externally from said each valve body. There is a pair of spaced-apart, parallel shafts between the valve bodies, each said shaft being rotatably journalled at each end at an aperture in one of the valve bodies and axially slidable within said apertures, permitting said distance between the valve bodies to be varied. A first lever is connected to a first of the shafts, the first lever having a member connected thereto for engaging the valve stems, and a detent. A second lever is connected to a second of the shafts, the second lever having a notch for engaging the detent when the first lever is pivotted with the first shaft from a shut-off position to an open position where the member engages the valve stems to open the lift valves. The notch disengages from the detent when the second lever is pivotted with the second shaft so the first lever returns to the shut-off position and the lift valves are closed.

The invention offers significant advantages over the prior art. For example, the operation of the apparatus is extremely convenient. When used with an acetylene torch, the flow of both acetylene and oxygen can be started immediately by pushing, and thus pivotting, the first lever. The first lever is maintained in the open position by the notch on the second lever. When required, the flow of gases can be stopped instantaneously by pushing, and thus pivotting, the second lever so that the first lever is disengaged. The valve bodies can be mounted directly on the fittings on a torch and the slidable connection between the shafts and the valve bodies means that the spacing can be varied according to the spacing between the fittings on different torches. It should also be noted that the invention permits a simple and rugged construction to enhance reliable operation and a long life for the apparatus.

BRIEF DESCRIPTION OF THE DRAWINGS

FIG. 1 is a front elevational view of a valve apparatus according to an embodiment of the invention;

FIG. 2 is an exploded isometric view of the apparatus of FIG. 1 showing the fittings and internal components for the left valve body only which is shown in ghost;

FIG. 3 is a sectional view taken along line 3—3 of FIG. 1:

FIG. 4 is a sectional view taken along line 4—4 of FIG. 1; and

FIG. 5 is a perspective view of an alternative valve body.

DESCRIPTION OF THE PREFERRED EMBODIMENTS

FIGS. 1 through 4 illustrate a valve apparatus 1 according to an embodiment of the invention. The apparatus includes two adjacent valve bodies 2 and 4 which, in this embodiment, comprise a single block of a suitable metal such as brass. Both valve bodies are substantially identical, so only valve body 2 is described in detail.

Referring to FIG. 4, valve body 2 has an internal conduit 6 comprising a lower vertical portion 8, an upper vertical portion 10 and a short horizontal portion 12 connecting the vertical portions. The lower vertical portion of the internal conduit extends downwardly to the bottom 14 of the valve body. A male threaded fitting 16, which is capable of connecting the valve body to a hose or other source of pressurized gas, is threadedly received within the lower vertical portion.

Referring to FIGS. 2 and 4, a check valve 18 is slidably received within the top of the male fitting for vertical movement. The check valve is substantially in the shape of a truncated cone with a lower depending stem 20. A series of vertical grooves 22 in the stem allow the passage of gas upwardly past the stem. The top 24 of the fitting 16 serves as a valve seat. An upper shoulder 26, as seen in FIG. 4, is formed within the internal conduit of the valve body, while a lower shoulder 28 is formed on the top of check valve 18. A coil spring 30 is compressed between shoulders 26 and 28 and resiliently biases check valve 18 downwardly against the top of fitting 16.

A conical lift valve 32 with a depending valve stem 34 is located within the horizontal portion 12 of the internal conduit for reciprocation therein. A bevelled shoulder 36 in the internal conduit serves as a seat for lift valve 32.

The horizontal portion 12 of the internal conduit is closed at the rear 40 of the valve body by a threaded sealing plug 38. A cylindrical socket 42 is formed at the inside end of plug 38 and serves as a guide for slidably receiving one end of valve stem 34. A coil spring 44 is compressably received between plug 38 and valve 32 about the stem 34. Spring 44 serves to resiliently bias the lift valve towards the shut-off position illustrated in FIG. 4 where the valve is against bevelled shoulder 36.

A plug 46 is threadedly received within the complementary shaped aperture 48 in the front 50 of the valve body. Plug 46 has a central aperture 52 which serves as a guide for the front end of valve stem 34 which extends therethrough. Accordingly, the front end of the valve stem is engagable externally from the valve body. An O-ring 54 is compressed between the plug 46 and shoulder 56 located between aperture 48 and the horizontal portion 12 of the internal conduit 6. O-ring 54 provides a seal around the valve stem to prevent leakage of gas outwardly through aperture 48 in the valve body and aperture 52 in plug 46.

As discussed above, fitting 16 serves an inlet fitting at the bottom end of conduit 6 for connecting the valve body to a source of gas. The gas flows upwardly through check valve 18 and through lift valve 32, when opened, and then through upper vertical portion 10 of the conduit to female fitting 58. Fitting 58 serves as an outlet fitting on the top 60 of the valve body at the opposite end of conduit 6 from the fitting 16. Fitting 58 consists of two parts, namely a thread sealing nipple 62 threadedly received at the top of vertical portion 10 of the internal conduit and a tightening nut 64. Gas is discharged from fitting 58 which can be connected to a male fitting of a torch.

As seen in FIG. 4, valve body 2 has a pair of spaced-apart apertures 66 and 68, which are circular in section, extending into side 70, shown in FIG. 2, which faces the right valve body 4. As mentioned above, the right valve body is substantially the same as the left valve body 2 and so the same numbers are used for equivalent parts with the additional designation "0.1". As seen in FIG. 2, aperture 66.1 and 68.1 in valve body 4 are also located on the side 70.1 which faces the other valve body 2. However, side 70.1 is on the opposite side of valve body 4 when compared with side 70 of valve body 2. This is the only way in which the two valve bodies differ.

Valve apparatus 1 includes a pair of spaced-apart, parallel shafts 72 and 74. Shaft 72 is rotatably journalled at one end in aperture 66 of valve body 2 and is rotatably journalled at the other end in aperture 66.1 of valve body 4. Shaft 74 is rotatably journalled in aperture 68 of valve body 2 at one end and is rotatably journalled in aperture 68.1 of valve body 4 at the other end. Moreover, shaft 72 is axially slidable within apertures 66 and 66.1, while shaft 74 is axially slidable within apertures 68 and 68.1. Since these shafts are the means interconnecting valve bodies 2 and 4, this means that the distance between the valve bodies can be varied to some degree and is accommodated by the sliding of the shafts within the apertures.

A first L-shaped lever 76 is fitted onto shaft 72, the shaft being near the bottom 78 of its vertical arm 80 as seen in FIG. 3. A push button 82 near top 84 of the vertical arm provides a portion of the first lever in front of the valve bodies adapted for pushing and thereby pivoting the first lever from the shut-off position shown in solid lines in FIG. 3 to the open position shown in broken lines in FIG. 3. A horizontal bar 86 is rigidly connected to the front of vertical arm 80 of lever 76 generally midway between the top and bottom thereof. Bar 86 is sufficiently long to contact the exposed outer end of valve stem 34 in valve body 32 and the corresponding valve stem of valve body 4. Accordingly, when button 82 is pushed to pivot the lever to the open position shown in broken lines in FIG. 3, bar 86 pushes against the valve stems and opens the lift valves in both valve bodies, permitting a flow of gas through the conduits in the valve bodies.

The apparatus also includes a second lever 88 with a vertical arm 90 and a horizontal arm 92. Lever 88 is fitted onto shaft 74 which is near top 94 of the vertical arm. As seen best in FIG. 3 and FIG. 2, lever 88 has a notch 96 formed near the bottom 98 of the vertical arm and above the horizontal arm 92.

Outer end 100 of horizontal arm 102 on lever 76 serves as a detent which engages notch 96 when lever 76 is pivotted to the open position shown in broken lines in FIG. 3.

A leaf spring 104 is connected to a pin 106 slidably connected to valve bodies 2 and 4 and presses against the back of lever 88, resiliently biasing this lever towards lever 76. A coil spring could be substituted if desired. Consequently, when lever 76 is pivotted to the open position shown in broken lines in FIG. 3, spring 104 urges lever 90 forwardly so that the outer end 100 of horizontal arm 102 is engaged with notch 96 on lever 88. This maintains lever 76 in the open position where bar 86 presses against the stems of the lift valves in the two valve bodies to open the internal conduits for a flow of gas.

Another push button 108 is connected to the outer end 110 of the horizontal arm 92 on lever 88. Button 108 serves as a portion of lever 90 in front of the valve bodies adapted for pushing and thereby pivotting lever 88 in opposition to pressure of spring 104 so the outer end 100 of horizontal bar 102 on lever 76 disengages from notch 96 and lever 76 returns to the shut-off position, shown in solid lines in FIG. 3, where the lift valves are closed. Lever 88 is provided with a second notch 112 above notch 96 which maintains lever 76 in the shut-off position until button 82 is pushed again. When lever 76 returns to the shut-off position, bar 86 moves outwardly away from the fronts of the valve bodies. This allows coil spring 44 within valve body 2 to push lift valve 32 forwardly and close the internal conduit, shutting off the flow of gas through the valve body. The same thing happens for the lift valve within valve body 4. Apparatus 1 is therefore capable of simultaneously shutting off or opening two gas supplies, one for each of the valve bodies, simply by pushing button 110 or button 82 as required. The apparatus is particularly adapted for use in acetylene welding where fitting 16 on valve body 2 would be connected to an acetylene hose, while fitting 16.1 of valve body 4 would be connected to the oxygen hose. When a welder wishes to temporarily stop the welding operation to adjust the work piece or the like, he simply pushes button 110 which shuts off the flow of oxygen and acetylene. This extinguishes the flame. To resume welding, button 82 is pushed to open the lift valves in the valve bodies and permit the flow of gas through the internal conduit to the torch which can then be lit. No adjustment of the torch controls is required and the torch can be re-lit without the usual smoky flame occuring with an oxygen deficiency.

As described above, since the shafts 72 and 74 and pin 106 are slidably fitted within the valve bodies, the spacing between the valve bodies can be varied according to the spacing of the fittings on the torch. Shims are placed between levers 76 and 88 and valve bodies 2 and 4 to keep the levers properly aligned when the spacing between the valve bodies is greater than that shown in FIG. 1. The shims may be made of suitable flat stock similar in shape to sides 70 and 70.1 of the valve bodies and with aperture for shafts 72 and 74.

The invention may also be useful for other applications, such as some diving operations, and fuel tanks in cars, with slight modification to the levers, where it would be desirable to provide a quick and convenient means of simultaneously shutting off and opening two or more gas supplies.

In order to save weight and reduce the cost of making the valve bodies, they may be shaped as shown in FIG. 5. Valve body 2.2 has a pair of apertures 66.2 and 68.2 for receiving shafts 72 and 74. The internal conduit 6.2 has a threaded portion at the top 60.2 of the valve body for receiving fitting 58 shown in FIG. 2. Fitting 16 is threadedly received at the bottom 14.2. Aperture 48.2 at the front of valve body 2.2 receives plug 46 through which valve stem 34 slidably projects. The internal conduit is similar to conduit 6 of valve body 2 in FIG. 4. Two such valve bodies 2.2 comprise the valve apparatus with the remaining components the same as in the previous embodiment. It may be appreciated that more than two valve bodies 2.2 can be combined to make up a valve apparatus for simultaneously opening or shutting off more than two gas or liquid supplies. Adjacent valve bodies would be slidably connected by shafts 72 and 74.

What is claimed is:

1. A valve apparatus for simultaneously shutting off or opening two gas supplies, the apparatus comprising:
   (a) two valve bodies for mounting a distance apart from each other, each said body having an internal conduit therethrough for the passage of gas, and a lift valve within the conduit for closing or opening the conduit with reciprocation of the valve, the lift valve having a valve stem engagable externally from said each valve body, the lift valve being resiliently biased towards a closed position;
   (b) a pair of spaced-apart, parallel shafts between the valve bodies, each said shaft being fitted at each end in an aperture in one of the valve bodies and axially slidable within said apertures, permitting said distance between the valve bodies to be varied;
   (c) a manually movable first lever fitted on a first of the shafts, the first lever having a member connected thereto for engaging the valve stems, and a detent, the first lever being pivotable between an open position where the member engages the valve stems to open the lift valves and a shut-off position where the lift valves are closed; and
   (d) a manually movable second lever fitted on a second of the shafts for pivotting about the second shaft, the second lever having a notch for engaging the detent when the first lever is in the open position, the second lever being pivotable so the notch disengages from the detent, the first lever returns to the shut-off position, and the lift valves close.

2. An apparatus as claimed in claim 1, further comprising springs resiliently biasing the lift valves towards the shut-off positions.

3. An apparatus as claimed in claim 2, further comprising a spring resiliently biasing the second lever to oppose the pivotting which disengages the notch from the detent.

4. An apparatus as claimed in claim 3, wherein each of the levers is generally L-shaped, having a generally horizontal arm with an outer end and a generally vertical arm with a top and a bottom, the horizontal arm of the first lever extending above the horizontal arm of the second lever to the vertical arm of the first lever, the first shaft being near the bottom of the vertical arm of the first lever and the second shaft being near the top of the vertical arm of the second lever, the detent comprising the outer end of the horizontal arm of the first lever and the notch being near the bottom of the vertical arm of the second lever and above the horizontal arm thereof.

5. An apparatus as claimed in claim 4, wherein each of the valve bodies has a front, the valve stems extending through said fronts, the first lever having a portion near the top of the vertical arm in front of the valve bodies adapted for pushing and thereby pivotting the first lever to the open position, the second lever having a portion near the outer end in front of the valve bodies adapted for pushing and thereby pivotting the second lever to disengage the first lever so the lift valves close.

6. An apparatus as claimed in claim 5, wherein the portions of the levers comprise push buttons.

7. An apparatus as claimed in claim 5, wherein the member of the first lever comprises a bar in front of the valve bodies contacting the valve stems of both valve bodies.

8. An apparatus as claimed in claim 1, further comprising an inlet fitting on each of the valve bodies at one end of the conduit for connecting said each valve body to a source of gas.

9. An apparatus as claimed in claim 8, further comprising an outlet fitting on each of the valve bodies at an end of the conduit opposite the one end for discharging gas.

10. An apparatus as claimed in claim 9, wherein the outlet fittings are on the tops of the valve bodies and the inlet fittings are on the bottoms of the valve bodies.

11. An apparatus as claimed in claim 10, further comprising a check valve in the internal conduit of each said valve body for stopping a back flow of gas towards the inlet fittings.

* * * * *